F. STEBLER.
FRUIT WASHING MACHINE.
APPLICATION FILED MAR. 20, 1916.
1,205,118.
Patented Nov. 14, 1916.
2 SHEETS—SHEET 1.
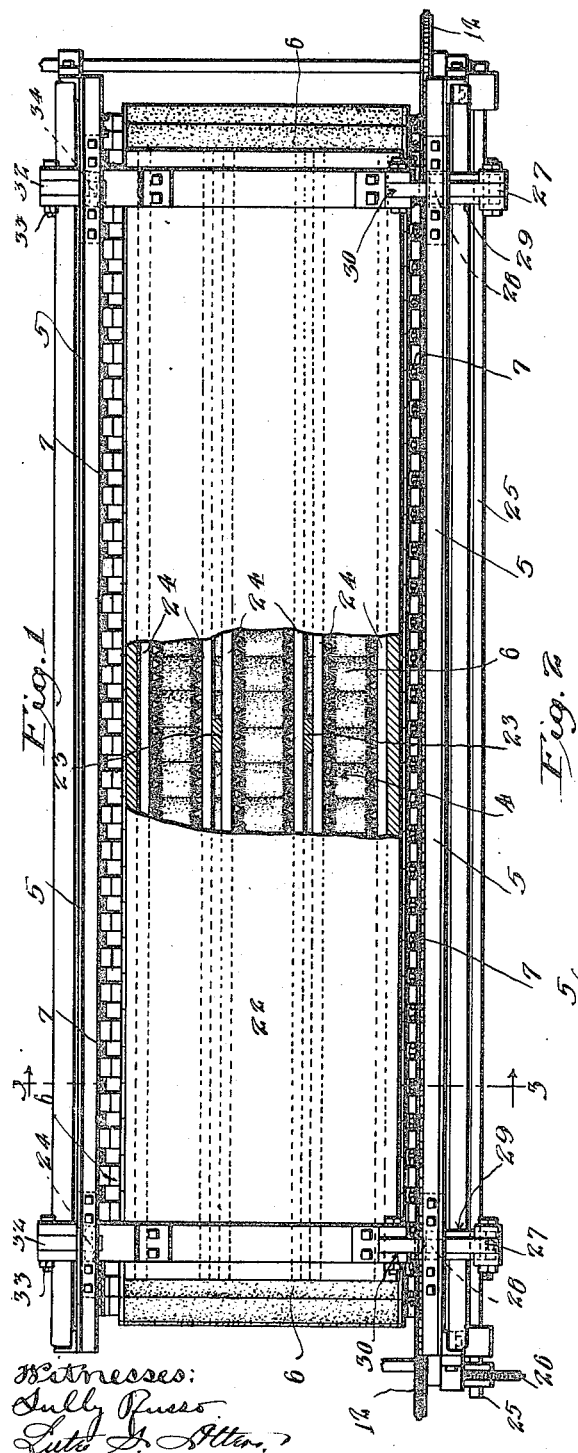
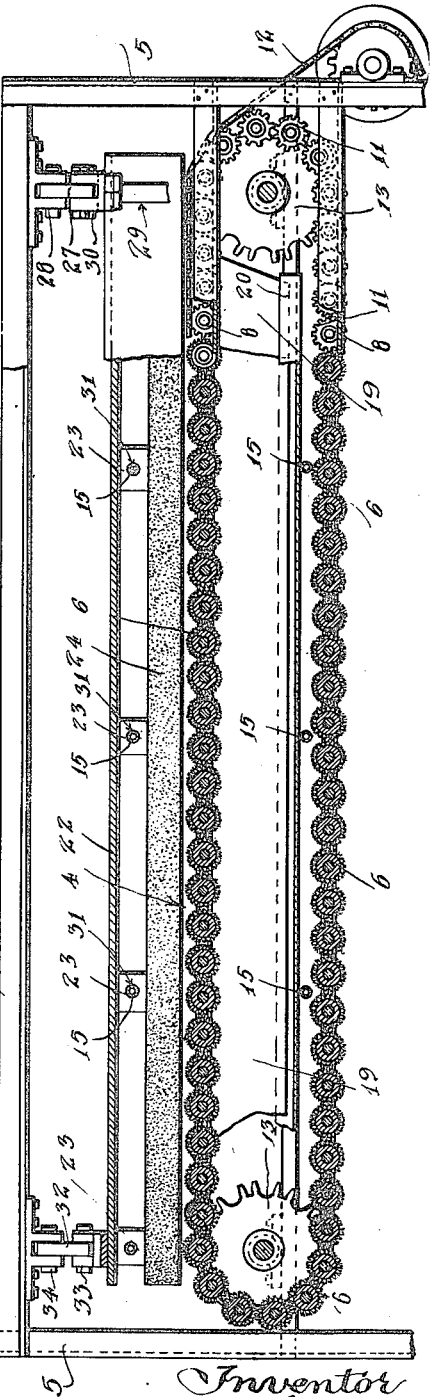

F. STEBLER.
FRUIT WASHING MACHINE.
APPLICATION FILED MAR. 20, 1916.
1,205,118.
Patented Nov. 14, 1916.
2 SHEETS—SHEET 2.
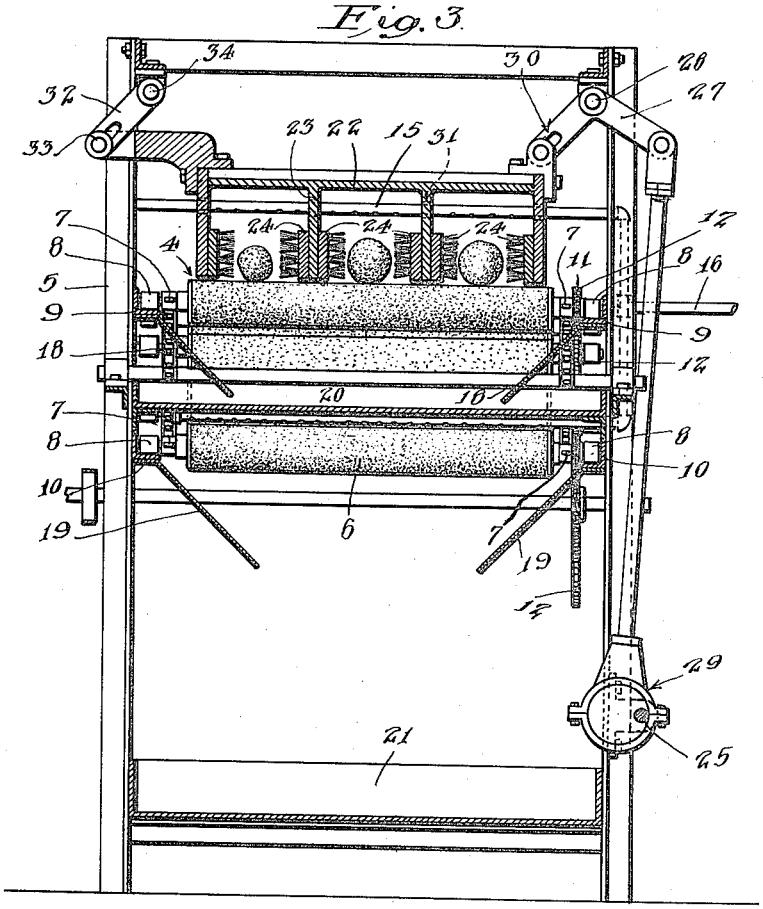
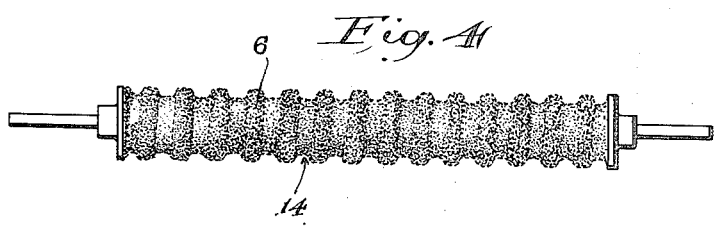

UNITED STATES PATENT OFFICE.

FRED STEBLER, OF RIVERSIDE, CALIFORNIA.

FRUIT-WASHING MACHINE.

1,205,118.   Specification of Letters Patent.   Patented Nov. 14, 1916.

Application filed March 20, 1916. Serial No. 85,508.

*To all whom it may concern:*

Be it known that I, FRED STEBLER, a citizen of the United States, residing at Riverside, in the county of Riverside and State of California, have invented a new and useful Fruit-Washing Machine, of which the following is a specification.

This invention relates to improvements in fruit washing machines of the type in which the fruit is moved in a given direction by and supported directly upon a plurality of rotating, bodily moving washing members and resides in the provision of means for moving the fruit back and forth upon the washing members in a direction substantially at right angles to the bodily movement of said members whereby the entire outer surface of each piece of fruit is caused to contact with the washing members and the fruit is thoroughly washed.

An object of this invention is to provide such a construction or interrelation of parts as will cause a relative lateral movement of the brushing members and fruit by positive mechanical action.

Other objects and advantages will appear in the course of the following detail description.

Referring to the drawings, Figure 1 is a top plan view of a machine constructed in accordance with my invention with parts broken away; Fig. 2 is a fragmentary, longitudinal sectional view taken through the machine showing parts in side elevation; Fig. 3 is a cross-sectional view taken on line 3—3 of Fig. 1; and Fig. 4 is a detail side elevation of one of the modified fruit supporting and washing brushes.

Referring to the drawings, 4 designates as an entirety fruit washing and conveying means which comprise a series of cylindrical, rotary, fruit supporting and washing members 6, preferably in the form of brushes and joined to one another at their ends so as to provide an endless conveyer for supporting, washing and conveying fruit. This means is mounted upon a frame 5. Suitable sprocket chains 7 connect the end of the members 6 with one another. Rollers 8 are mounted on the ends of the members 6 and ride upon track-bars 9 and 10 secured to and extending longitudinally of the frame 5.

The members 6 are closely associated and lie parallel to one another. Sprockets 11 are fixed to the members 6 and mounted upon the sprockets 11 of those of the members 6 which comprise the upper half of the conveyer is a chain 12 driven by any suitable means, not shown, so as to provide for the rotation of said members.

The means 4 as a whole is rotated by means of suitably driven sprockets 13 which mesh with the chains 7. As shown in the drawings the brush members may be spirally grooved as at 14 so as to provide for turning over the fruit in opposite direction, that is, back and forth while it is being carried forward and rotated.

Extending transversely with the frame, over the means 4 and also between the upper and lower halves of said means are a plurality of sprinkler pipes 15 which are connected with a feed pipe 16 and direct liquid upon the fruit that is supported and carried by the means 4 and parts of the lower half of said means. Deflectors 18 and 19 are carried by the frame 5 and are arranged to deflect the liquid from the means 4 into pans 20 and 21 also carried by the frame and located beneath the deflectors 18 and 19 respectively. The pan 20 is located between the upper and lower halves of the means 4 whereas the pan 21 and deflectors 19 are located below the means 4.

There is provided means for laterally moving the fruit back and forth substantially at right angles to the line of movement of the means 4, which comprises a horizontal longitudinal plate 22 extending the length of and located above the means 4. The plate 22 carries a plurality of depending spaced parallel members 23 which extend substantially the full length of the means 4 and on opposite sides carrying yielding fruit engaging and washing means 24 preferably in the form of brushes.

There is provided means for reciprocating the plate 22 and parts thereof at substantially right angles to the movement of the means 4 so as to cause the fruit moving along the frame and between the washing means 24 to be moved back and forth and the entire outer surfaces of the fruit to come into contact with the rotary as well as the stationary or laterally moving washing members. This means comprises a horizontal shaft 25 journaled in the frame and to which is fixed a sprocket 26 driven from a suitable source of power not shown. A bell crank 27 which is pivoted as at 28 upon the upper portion of the frame is rocked by an eccentric driving connection or means 29 which is connected with the crank 27 and shaft 25. One end of the bell crank 27 has a pin and slot connection 30 with the adjacent side of the plate 22. The plates 23 are provided with apertures 31 which aline with one another and receive the pipes 15. These pipes 15 act as guides for the frame 22 during the lateral movement of the latter. To steady and provide for an even movement of the frame 22 there may be provided a link 32 having a pin and slot connection 33 with the frame 5 on the side of the latter opposite to the bell crank 27. This link is also pivotally connected as at 34 with the adjacent side edge of the frame 22.

In operation, fruit to be washed is placed in any suitable manner upon the conveying and washing means 4 which moves the fruit in a given direction and causes it to rotate while being so moved. The brushes or washing members 6 of the means 4 in rotating provide for the washing of the fruit which while being moved and washed is sprinkled by the pipes 15. When the brushes 6 are spirally grooved as at 14 the fruit is caused to move laterally and this lateral movement is increased and the fruit caused to be moved back and forth substantially at right angles to its given line of movement by the reciprocating brushes 24. It will be seen that these brushes 24 form channels in which the fruit moves. Rotation of the shaft 25 causes a reciprocating movement to be transmitted to the plate 22 and brushes 24 carried thereby, through the eccentric driving means 29 and the bell crank or rocker 27. When the brushes 24 engage and move or shift the fruit laterally the fruit is being rotated and upon coming into contact with said brushes 24, all sides of each piece of fruit are brushed and washed. It will be seen that by laterally moving the fruit back and forth rotating it and moving it along a given line all of the surfaces of the fruit come into contact with the brushes 6 and 24 and the fruit is thoroughly brushed and washed.

While the means 4 is shown in a horizontal position it may be inclined so as to elevate the fruit if so desired and if desired the brushes may be plain instead of spirally grooved as shown in Fig. 4 of the drawings. However, the provision of the spiral grooves 14 accents the lateral movement of the fruit and gives a more thorough washing of the fruit.

An advantageous feature of the invention is the provision of laterally reciprocating means for moving fruit back and forth in a direction substantially at right angles to the given line of movement of the fruit and it will be noted that this means may be made up as an attachment adapted for connection with fruit washing means of the character described herein.

What I claim is:

1. In a fruit washing machine means to support and move fruit in a given direction including rotary washing members and laterally moving means to move the fruit back and forth at substantially right angles to its movement in a given direction.

2. In a fruit washing machine means to support and move the fruit in a given direction including rotary washing members and laterally reciprocating fruit engaging means to move the fruit back and forth while it is being moved in the given direction.

3. In a fruit washing machine means to support and move the fruit in a given direction including rotary washing members and laterally reciprocating fruit engaging means to move the fruit back and forth while it is being moved in a given direction including fruit engaging brushes.

4. In a fruit washing machine means to convey fruit, including rotary fruit engaging brushes and means to move the fruit laterally back and forth while it is being conveyed including brushes extending at right angles to the rotary brushes.

5. A fruit washing machine comprising a plurality of bodily moving rotating fruit supporting and washing members and a laterally reciprocating fruit engaging means to move the fruit back and forth while upon said members.

6. A fruit washing machine comprising a plurality of rotating bodily moving fruit supporting brushes, laterally reciprocal brushes mounted above said rotary brushes and substantially at right angles thereto and means to reciprocate said last-named brushes in a direction substantially at right angles to the line of bodily movement of the rotary brushes.

7. A fruit washing machine comprising a frame, a plurality of bodily moving rotating fruit supporting brushes mounted on the frame, a reciprocating member mounted above the brushes, fruit engaging brushes carried by said reciprocating member and means to reciprocate said member laterally.

8. In a fruit washing machine means to convey and wash fruit, a plate located above said conveying and washing means and supports depending from said plate and extending longitudinally of the conveying and washing means; yieldable fruit engaging means carried on the supports and means to laterally reciprocate the plate.

9. In a fruit washing machine, a plurality of bodily moving rotating fruit supporting members, a laterally reciprocating member mounted above said supporting and washing members for engaging and moving the fruit back and forth, and means to spray liquid upon the fruit.

10. In a fruit washing machine, a frame, a plurality of bodily moving rotating fruit supporting members mounted on the frame, a laterally reciprocating fruit engaging member mounted above the washing and supporting members and including a plurality of brushes extending longitudinally of the frame and providing channels between each other in which the fruit moves.

11. In a fruit washing machine, means, including rotary washing members, to support and move fruit in a given direction, laterally moving means to move the fruit back and forth on said members transversely of the longitudinal movement of said first named means, and means for rotating said washing members independent of said longitudinal movement.

12. In a fruit washing machine, a plurality of bodily moving rotating fruit supporting brushes, a laterally reciprocating member mounted above said brushes for engaging and moving the fruit back and forth, means for supplying liquid to said fruit, and means for rotating said brushes independent of their bodily movement.

13. A fruit washing machine having a conveyer including rotary washing brushes arranged parallel to each other and transverse to the line of movement of the conveyer, means for rotating said brushes independent of the movement of said conveyer, and laterally moving means to move the fruit back and forth on said brushes transverse to the movement of said conveyer.

14. In a fruit washing machine, longitudinally moving means including rotary washing members, to support and move the fruit, and laterally moving means for causing a relative movement between the fruit and the washing members transverse of the longitudinal movement.

15. A fruit washing machine having a longitudinally moving conveyer including rotary washing brushes arranged parallel to each other and transverse to the line of movement of the conveyer, and laterally moving means for causing a relative movement of the fruit on said washing members lengthwise of said members.

16. In a fruit washing machine, longitudinally moving means including rotary washing members to support and move the fruit, fruit engaging and washing brushes mounted above the washing members longitudinally thereof, and means for causing a relative movement between the rotary members and fruit engaging and washing brushes transverse to the movement of the longitudinally moving means.

17. A fruit washing machine comprising a conveyer including rotary fruit supporting and washing brushes, arranged parallel to each other and transversely to the line of movement of the conveyer, fruit engaging and washing means mounted above the brushes extending longitudinally thereof, and means for causing a relative movement between the rotary brushes and washing means transversely to the longitudinal movement of the conveyer.

18. A fruit washing machine comprising a longitudinally moving conveyer including fruit supporting and washing brushes arranged parallel to each other and transverse to the line of movement of the conveyer, fruit engaging and washing means mounted above the brushes and extending longitudinally of the conveyer, and means for causing a relative movement between the brushes and washing means transversely to the longitudinal movement of the conveyer.

Signed at Los Angeles, California, this 3d day of March, 1916.

FRED STEBLER.

Witnesses:
CHAS. J. CHUNN,
M. L. OWEN.